United States Patent [19]
Hardin

[11] Patent Number: 4,464,827
[45] Date of Patent: Aug. 14, 1984

[54] METHOD OF INTERCONNECTING CELLS IN BATTERIES

[75] Inventor: Jasper E. Hardin, Redlands, Calif.

[73] Assignee: Teledyne Industries, Inc., Los Angeles, Calif.

[21] Appl. No.: 472,477

[22] Filed: Mar. 7, 1983

[51] Int. Cl.³ .............................................. H01M 6/00
[52] U.S. Cl. .................. 29/623.2; 29/623.1; 29/623.4; 429/161
[58] Field of Search ................ 29/623.1, 623.2, 623.4; 429/161

[56] References Cited

U.S. PATENT DOCUMENTS

| | | | |
|---|---|---|---|
| 1,126,671 | 1/1915 | Wilson | 429/161 |
| 1,781,640 | 11/1930 | Holland | 429/161 |
| 2,552,405 | 5/1951 | Chapman | 429/161 |
| 3,259,525 | 7/1966 | Wilson | 29/623.2 |
| 3,846,175 | 11/1974 | Desai | 429/161 |
| 4,086,695 | 5/1978 | Cornette et al. | 29/623.1 |
| 4,224,736 | 9/1980 | Feldhake | 29/623.4 |

*Primary Examiner*—Howard N. Goldberg
*Assistant Examiner*—P. W. Echols
*Attorney, Agent, or Firm*—Reagin & King

[57] ABSTRACT

An improved method of interconnecting cells in batteries is disclosed, where the cells are connected using lead links which straddle the walls separating the cells in the battery housing. Grooves are provided in the surfaces of the links which are adjacent the walls and multiple indentations are provided in the opposite surfaces of the links. The links are coated with a sealant which flows into the grooves under the force of capillary action and forms a gas tight seal between cells.

5 Claims, 8 Drawing Figures

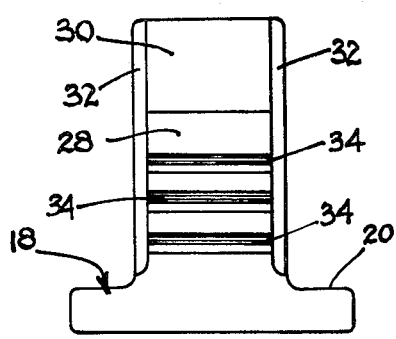
FIG.3
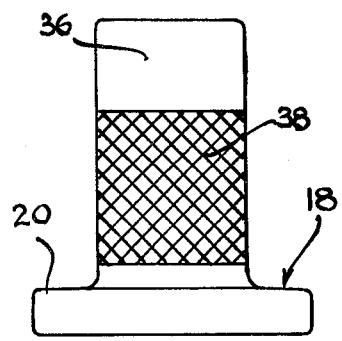
FIG.4
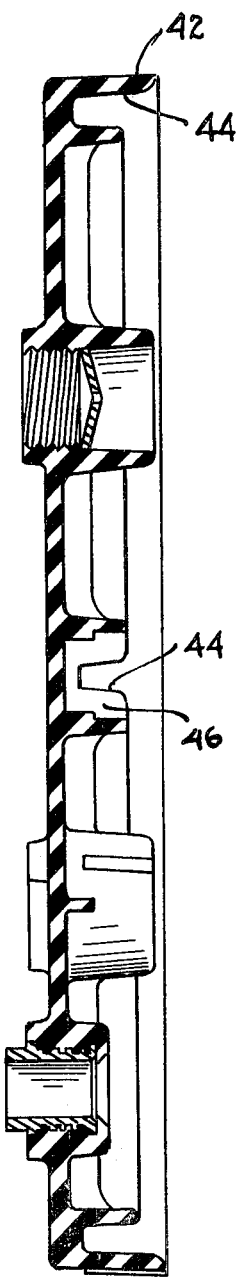
FIG.7
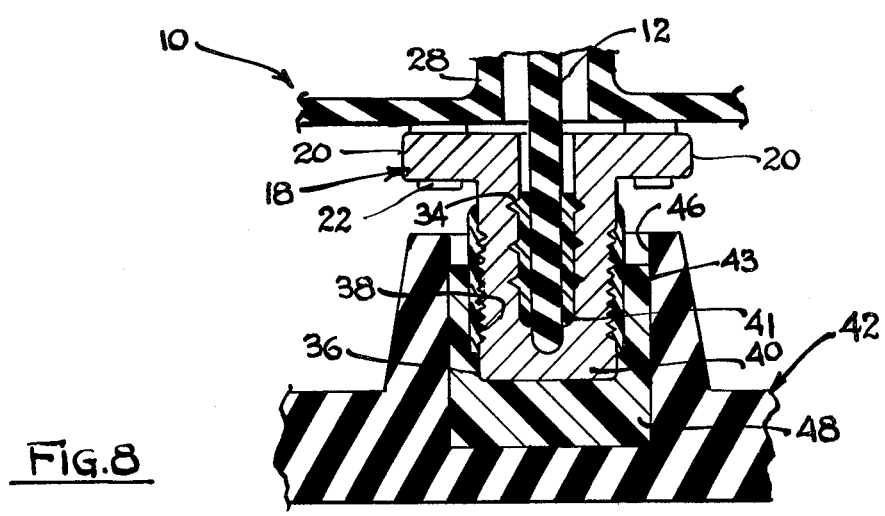
FIG.5
FIG.8

METHOD OF INTERCONNECTING CELLS IN BATTERIES

BACKGROUND OF THE INVENTION

This invention relates to batteries and, more particularly, to intercell connectors for batteries.

In general, batteries comprise a housing containing multiple cells in an acid electrolyte. The housing is generally manufactured of a rubber or plastic material, and the cells are generally formed of lead and lead oxide plates. Each cell is physically separated from the adjacent cell within the housing by employing, for example, intersecting barrier walls spaced apart within the housing to form an individual cavity for each cell. The cells are electrically interconnected to provide the desired battery voltage, and a cover is provided which is attached to the top of the housing in a manner which is intended to seal the cells within their respective cavities.

To provide a reliable battery, it is necessary to prevent gases which develop within each cell during the operation of the battery from leaking into adjacent cells. In the construction of prior art batteries, it has been found that the intercell electrical connections provide a path for intercell gas leakage. This is particularly true when the batteries are subjected to thermal shock tests as required by many military specifications. Such shock testing tends to cause the materials used to interconnect and to seal the various cells to separate, producing voids which permit intercell gas leakage.

Accordingly, it is an object of the present invention to provide a new and improved battery.

It is another object of the present invention to provide a battery having improved intercell connectors which minimize intercell gas leakage.

It is yet another object of the present invention to provide an improved method of interconnecting cells of a battery.

SUMMARY OF THE INVENTION

The foregoing and other objectives of the invention are accomplished by providing a battery housing having intersecting vertical barrier walls which form multiple cavities within the housing. Each cavity has an opening defined by the top surface of the barrier walls, and a battery cell is mounted within each cavity.

Lead bars are provided which are formed into links which straddle the top of the barrier wall and electrically interconnect adjacent cells. Grooves are provided along the inner surfaces of each link adjacent the barrier wall, where each groove is substantially parallel to the top surface of said wall. The outer surfaces of each link are knurled.

A liquid sealant is applied to the portion of each link straddling the respective wall, whereby the sealant flows into the grooves under the force of capillary action and provides a gas tight seal in the space between the inner surface of each link and the respective barrier wall. The sealant also flows into the multiple indentations of the knurl and adheres to the outer surface of each link.

A cover is provided having intersecting recesses corresponding to the intersecting barrier walls of the housing. The cover is bonded to the housing using an adhesive such as epoxy resin, whereby the top surfaces of the barrier walls including the outer surfaces of the links are adhesively bonded within the recesses of the cover. The sealant adhering to the outer surface of each link provides a gas-tight seal between that outer surface and the adhesive.

Other objects, features and advantages of the invention will become apparent from a reading of the specification taken in conjunction with the drawings in which like reference numerals refer to like elements in the several views.

BRIEF DESCRIPTION OF THE DRAWINGS

FIG. 3 is a side view of one of the interconnecting bars of FIG. 2, showing the side of the bar facing toward the barrier wall;

FIG. 4 is another side view of the interconnecting bar of FIG. 3, showing the side of the bar facing away from the barrier wall;

FIG. 5 is a perspective view, partially cut-away of the set of interconnecting bars of FIG. 2 after the bars have been heated to form a link;

FIG. 7 is a cross-sectional view of the cover of FIG. 6, taken along the line 7—7 of FIG. 6; and FIG. 8 is a cross-sectional view showing the link of FIG. 5 after the battery cover has been assembled to the battery housing.

DESCRIPTION OF THE PREFERRED EMBODIMENT

Figure 1:
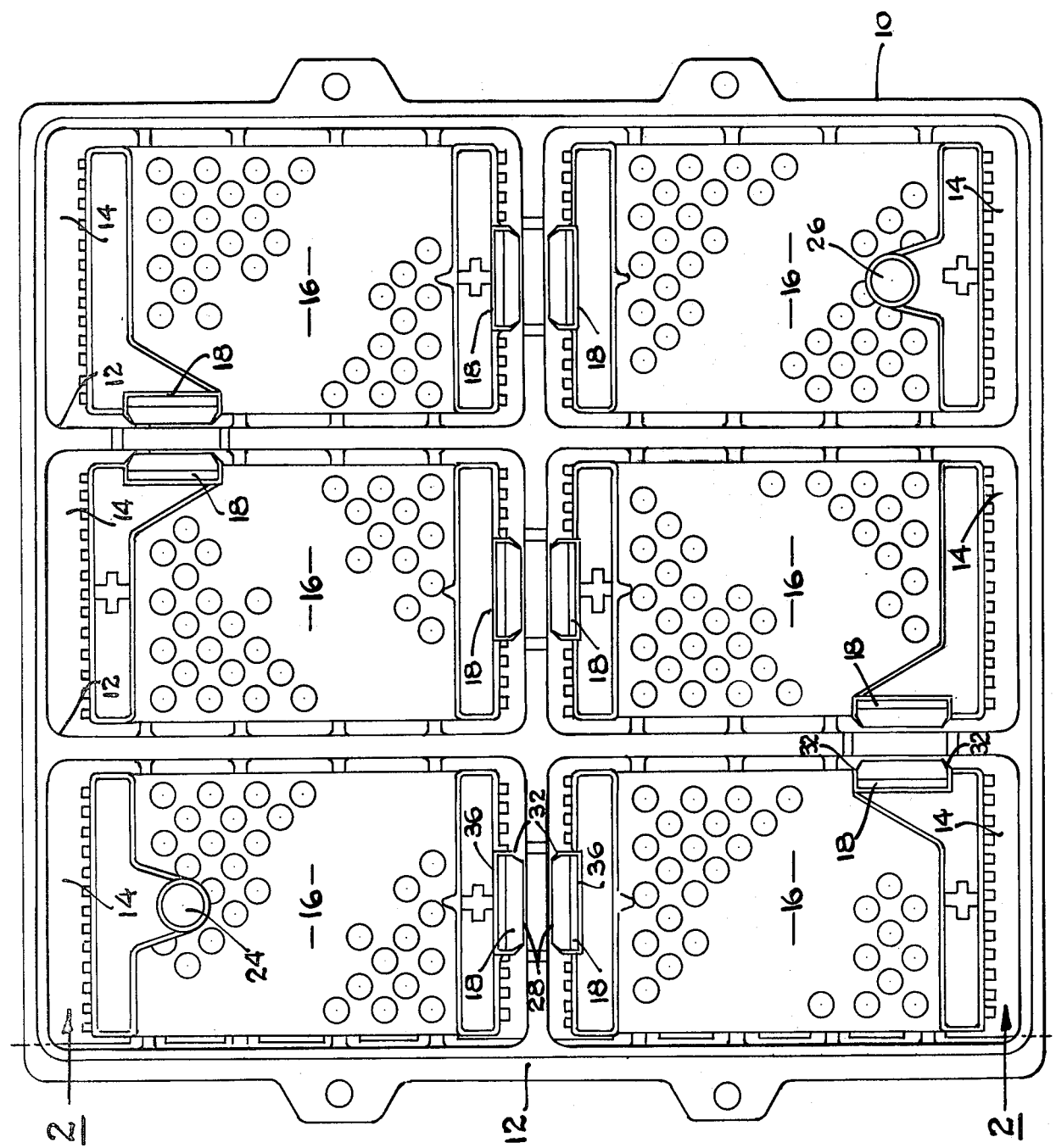
FIG. 1 is a top view of a battery housing employed in the present invention, showing the battery cells and interconnecting bars positioned within the housing.
Figure 2:
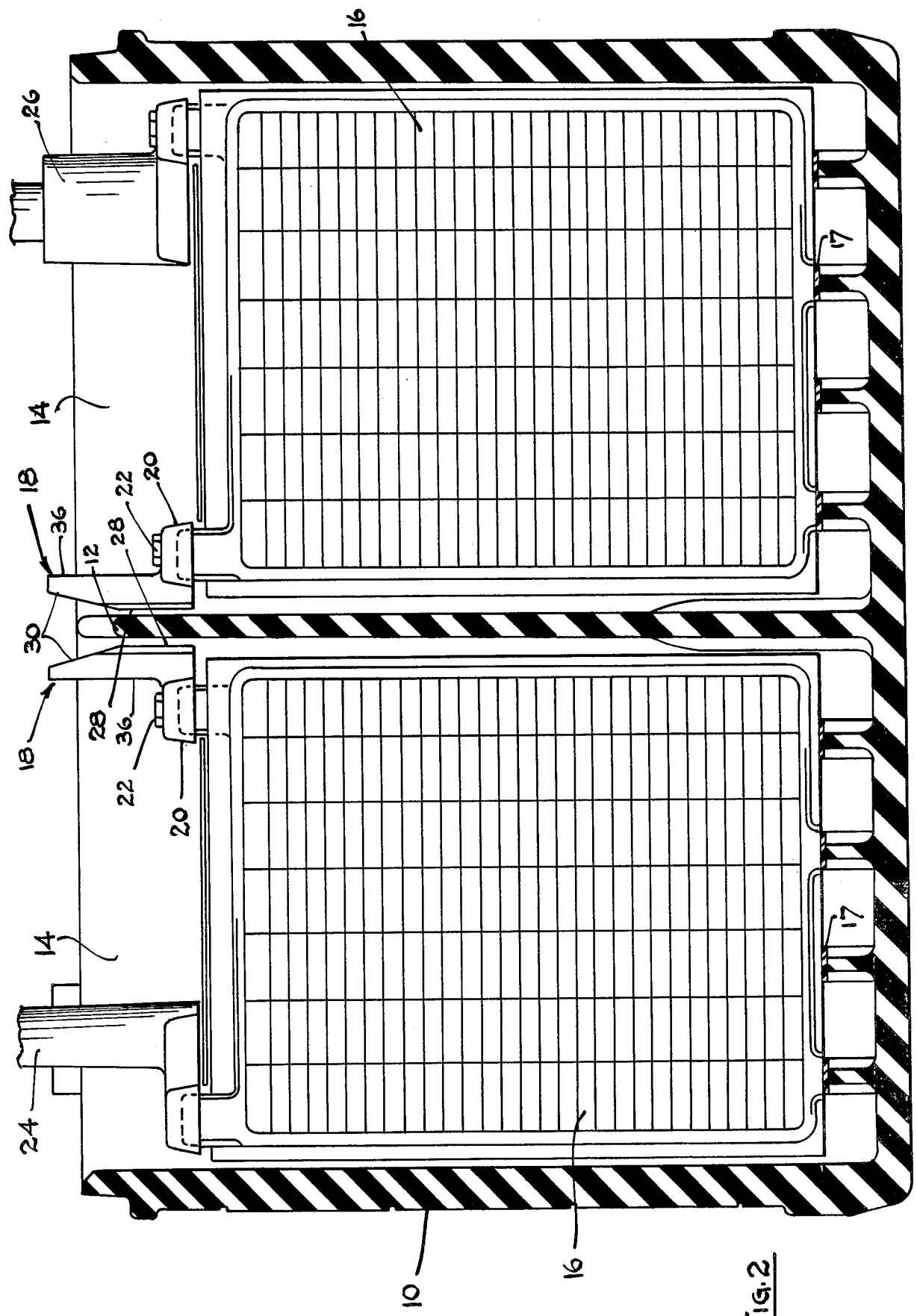
FIG. 2 is a left side view in cross-section of FIG. 1, taken along the line 2—2 of FIG. 1, showing the position of one set of interconnecting bars in relation to a barrier wall in the housing of FIG. 1.

Referring to FIGS. 1 and 2 there is shown a battery housing 10 having interior vertical walls 12 which intersect to form six cavities 14. The housing may be formed of rubber or a plastic material such as polypropylene. Mounted within each cavity 14 is a battery cell 16. Each cell 16 is fastened within the housing 10 using epoxy 17 or other suitable adhesive. Projecting above each cell 16 is an L-shaped bar 18, preferably formed of lead. The bottom leg 20 of each bar 18 is electrically and mechanically connected to a terminal 22 of the respective cell, as shown in FIG. 2. Generally, the terminal 22 is also formed of lead, and the bar 18 may be attached to the terminal 22 by locally heating and melting together the respective parts.

As shown in FIGS. 1 and 2, the bars 18 are positioned in adjacent pairs on opposite sides of the walls 12. As described below, the top portions of adjacent pairs of bars 18 are heated and melted together to form an interconnecting link between adjacent cells. From the pattern of bars 18 shown in FIG. 1, it may be appreciated that the interconnecting links described above serve to electrically interconnect the six battery cells 16 in a series circuit. Terminal posts 24 and 26 are electrically connected to the negative and positive ends, respectively, of the series circuit, and serve as the output terminals of the battery.

FIG. 3 is a side view of one of the bars 18, showing side 28 of the bar 18 which faces the barrier wall 12 in the view of FIG. 2. A top portion 30 of the side 28 is tapered as shown in FIG. 2, and the ends 32 of the side 28 are chamfered as shown in FIG. 1. Generally triangular shaped grooves 34 are provided in the surface of the side 28. In a preferred embodiment, the grooves 34 are each approximately ten-thousandths of an inch wide and approximately ten-thousandths of an inch deep, and are spaced apart approximately one-hundred and twenty-five thousandths of an inch. The grooves 34 are parallel to each other and are substantially parallel to the top surface of the bar 18.

FIG. 4 is another side view of one of the bars 18, showing side 36 of the bar 18, which faces away from the barrier wall 12 in the view of FIG. 2. A portion of the surface of the side 36 is provided with a pattern of multiple indentations 38, which may be formed by knurling the surface, or by a similar operation.

To electrically interconnect the various cells 16, forms (not shown) are fitted over the top ends of the lead bars 18, and heat is applied to these ends. The top ends of the bars 18 melt and flow together over the top of the wall 12, forming an interconnecting link 40 which straddles the wall 12 as shown in FIG. 5.

To ensure that gases developed in one cell 16 cannot leak into adjacent cells, it is necessary to ensure a gas tight seal between the wall 12 and the sides 28 of the link 40. In the present invention, this is accomplished by applying a liquid sealant to the links 40 in such a manner that the sealant is drawn under the force of capillary action into the grooves 34 which are substantially parallel to the top surface of the wall 12. In a preferred embodiment, the battery housing 10, including the cells 16 and the formed links 40 is inverted and dipped into a shallow tray containing the sealant, whereby the portions of the links 40 including the grooves 34 and the knurls 38 are submerged in the sealant.

A sealant which has been found to be suitable for use in the present invention is a two part liquid mixture manufactured by Reliance Universal, Inc., Brea, Calif. The mixture consists of 10 parts by volume of a base material, part number 851-W018-3 and 1 part by volume of an activator, part number 853-CO18-164. The weight per gallon is approximately ten pounds for the base material and approximately eight pounds for the activator. The viscosity is approximately 60 K.U. @ 77° F. for the base material and is approximately Q-V (Gardner-Holt scale) for the activator.

It has been found that the grooves 34 act as capillaries and that the sealant is drawn into these grooves and hardens to form a reliable gas-tight seal between the sides 28 and the wall 12, as shown by the areas designated 41 in FIG. 8. The sealant also flows into the multiple indentations 38 and forms a strong bond to the sides 36 of the link 40, as shown by the areas designated 43 in FIG. 8.

Figure 6:
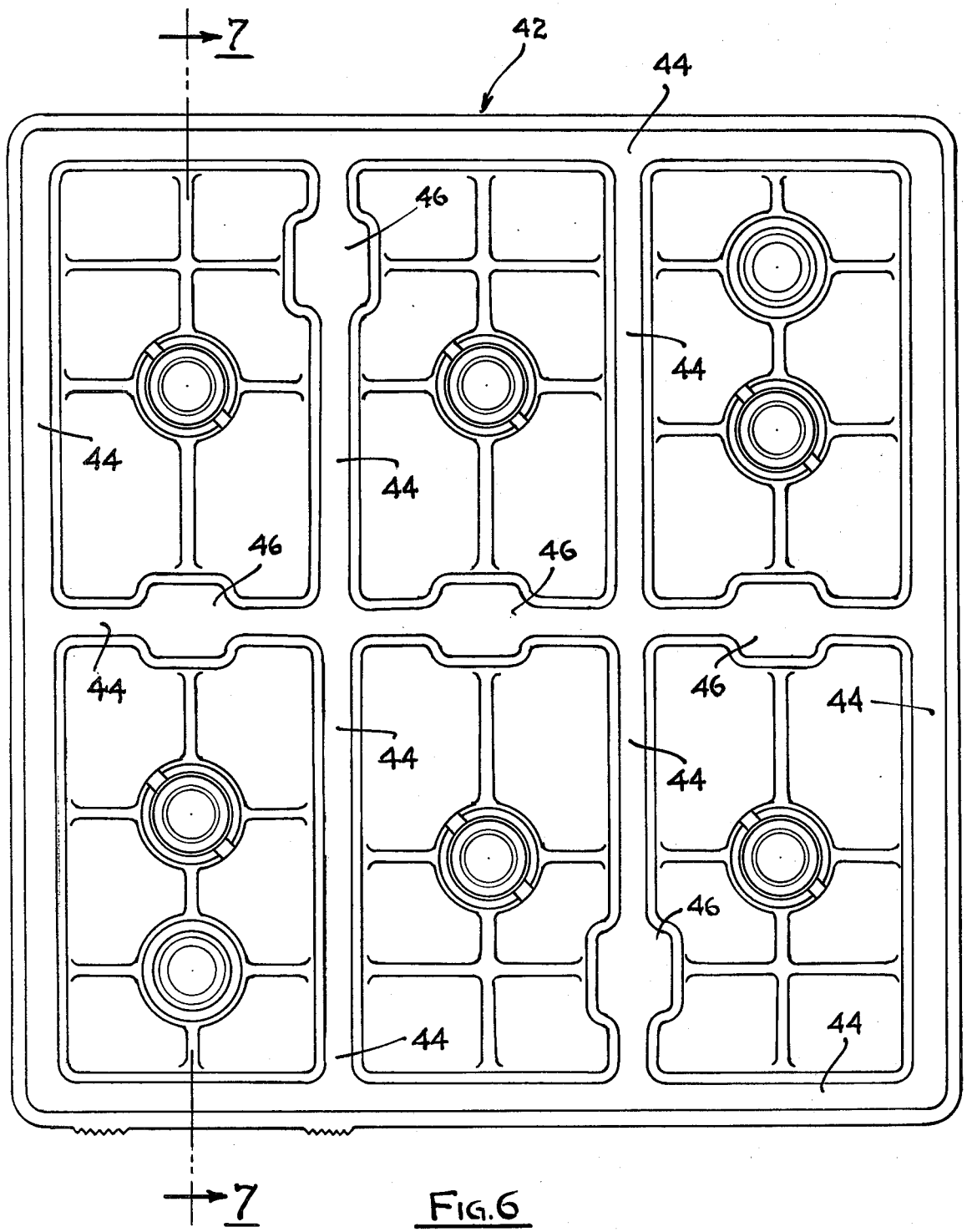
FIG. 6 is a bottom view of a battery cover employed in the present invention.

To enclose the individual cells 16 within their respective cavities 14, a cover 42 is provided, as shown in FIGS. 6 and 7. The bottom surface of the cover 42 includes intersecting recesses 44 which correspond in position to the top surfaces of the intersecting barrier walls 12 of the housing 10 when the cover 42 is attached to the top of the housing 10. Widened portions 46 of the recesses 44 are provided in locations corresponding to the positions of the links 40.

In a preferred embodiment of the invention, the cover 42 is assembled to the housing 10 in the following manner. The cover 42 is placed on a flat surface with the bottom side facing upward. A liquid epoxy adhesive 48 is dispensed into the recesses 44. The housing 10, including the cells 16 and the links 40, is then inverted and placed over the cover 42. The top portions of the walls 12 and the links 40 are submerged in the epoxy 48 as shown in FIG. 8. When the epoxy 48 hardens, the sealant in the areas 43 acts to provide a reliable gas-tight seal between the sides 36 of the link 40 and the epoxy 48. In a preferred embodiment, the epoxy adhesive 48 is a two part mixture comprising equal parts of a resin and a hardener manufactured by Reliance Universal, Inc., Brea, Calif. The resin, Part Number 850-CO18-234, weighs approximately twelve pounds per gallon and has a maximum viscosity of 6500 CPS at 77° F. The hardener, Part Number 853-BO18-174, weighs approximately twelve pounds per gallon and has a maximum viscosity of 9000 CPS at 77° F.

In an alternate embodiment of the invention, after the links 40 are formed from the bars 18, they are chemically treated to remove surface oxides. The surface oxides may be removed from the lead links 40 using one of a number of chemical compounds such as hydrogen peroxide or chromic acid. The top portions of the walls 12 and the links 40 are then directly submerged in the epoxy 48 (previously dispensed into the recesses 44 of the cover 42) without applying any sealant in the areas 41 or 43 of the links 40.

It has been found that when the links 40 are treated to remove surface oxides, the epoxy 48 is able to flow into the grooves 34 by capillary action, and the epoxy 48 also is able to flow into and adhere to the multiple indentations 38 on the sides 36 of the link. Accordingly, in this embodiment, the epoxy 48 provides the seal between the sides 28 of the link 40 and the wall 12, as well as between the sides 36 of the link 40 and the walls of the widened portion 46 of the recesses 44.

While there has been shown and described preferred embodiments of the invention, it is to be understood that various other adaptations and modifications may be made within the spirit and scope of the invention. It is thus intended that the invention be limited in scope only by the appended claims.

What is claimed is:

1. In a method of interconnecting cells of a battery including the steps of providing a battery housing having intersecting vertical barrier walls which form multiple cavities within the housing, each cavity having an opening defined by top surfaces of the barrier walls; mounting each cell within a respective cavity; forming a conductive link which straddles the top of one barrier wall and electrically interconnects adjacent cells; providing a cover having intersecting recesses corresponding to the intersecting barrier walls of the housing; providing an adhesive; and bonding the top surfaces of the barrier walls, including an outer surface of the link straddling the one barrier wall, within the recesses of the cover using the adhesive, the improvement comprising:

as part of the step of forming a link, forming grooves along an inner surface of the link adjacent the one barrier wall, where each groove is substantially parallel to the top surface of said wall;

as further part of the step of forming a link, forming multiple indentations in the outer surface of the link opposite to the inner surface thereof; and applying, prior to the step of bonding the top surfaces of the walls within the recesses of the cover, a liquid sealant to the portion of the link straddling the one barrier wall, whereby the sealant flows into the grooves under the force of capillary action and provides a gas tight seal in the space between the inner surface of the link and the one barrier wall, and whereby the sealant flows into the multiple indentations and adheres to the outer surface of the link and provides a gas tight seal between the outer surface of the link and the adhesive.

2. The method of claim 1 where the link is formed of lead.

3. The method of claim 1 in which the step of applying a sealant includes the step of immersing the portion of the link straddling the one barrier wall into the sealant.

4. The method of claim 1 in which the step of forming multiple indentations includes the step of knurling the outer surface of the link.

5. In a method of interconnecting cells of a battery including the steps of providing a battery housing having intersecting vertical barrier walls which form multiple cavities within the housing, each cavity having an opening defined by top surfaces of the barrier walls; mounting each cell within a respective cavity; forming a conductive link which straddles the top of one barrier wall and electrically interconnects adjacent cells; providing a cover having intersecting recesses corresponding to the intersecting barrier walls of the housing; providing an adhesive; and bonding the top surfaces of the barrier walls, including an outer surface of the link straddling the one barrier wall, within the recesses of the cover using the adhesive, the improvement comprising:

as part of the step of forming a link, forming grooves along an inner surface of the link adjacent the one barrier wall, where each groove is substantially parallel to the top surface of said wall;

as further part of the step of forming a link, forming multiple indentations in the outer surface of the link opposite to the inner surface thereof; and removing, prior to the step of bonding the top surfaces of the walls within the recesses of the cover, surface oxides from the inner and outer surfaces of the link, whereby when the top surfaces of the barrier walls are bonded within the cover recesses the adhesive flows into the grooves under the force of capillary action and provides a gas tight seal in the space between the inner surface of the link and the one barrier wall, and whereby the adhesive flows into the multiple indentations and adheres to the outer surface of the link and provides a gas tight seal between the outer surface of the link and the cover.

* * * * *